United States Patent [19]
Reed et al.

[11] Patent Number: 6,075,685
[45] Date of Patent: Jun. 13, 2000

[54] SPEED PROTECTION SYSTEM FOR A MACHINE AND A METHOD THEREOF

[75] Inventors: John Arthur Reed, Scio; Kurt Arne Schmidt, Belmont; Terry Edward Vossler, Wellsville, all of N.Y.

[73] Assignee: Dresser-Rand Company, Corning, N.Y.

[21] Appl. No.: 09/187,707

[22] Filed: Nov. 6, 1998

Related U.S. Application Data

[60] Provisional application No. 60/064,598, Nov. 6, 1997.

[51] Int. Cl.$^7$ ...................................................... H02H 5/00
[52] U.S. Cl. ............................... 361/23; 361/51; 361/53; 361/93.1; 361/115
[58] Field of Search ............................... 361/23, 24, 93.1, 361/51, 52, 53, 115

[56] References Cited

U.S. PATENT DOCUMENTS

| | | | |
|---|---|---|---|
| 4,145,728 | 3/1979 | Royer | 361/23 |
| 4,521,894 | 6/1985 | Moffat | 377/16 |
| 4,570,110 | 2/1986 | Bloom et al. | 318/313 |
| 4,739,435 | 4/1988 | Nothofer | 361/23 |
| 5,349,276 | 9/1994 | Mezzatesta, Jr. et al. | 318/268 |

OTHER PUBLICATIONS

Advertising Brochure : "ProTech™ 203 Overspeed Protection System" by Woodward Governor Company (1993).

*Primary Examiner*—Stephen W. Jackson
*Attorney, Agent, or Firm*—Nixon Peabody LLP

[57] ABSTRACT

The present invention relates to a speed protection system for monitoring the speed of a rotating shaft in a machine. The speed protection system includes a first speed detection system, a first time delay system, and a first time delay system. The first speed detection system determines a first rotational speed of the shaft in the machine. The first tripping system is coupled to the first speed detection system and to the machine. The first tripping system trips the machine to stop the rotation of the shaft when the first rotational speed is either less than a minimum speed or is more than a maximum speed. The first time delay system is coupled to the first tripping system. The first time delay system prevents the first tripping system from tripping the machine if the first rotational speed is less than the minimum speed until either a first period time has expired or the first rotational speed exceeds a first enabling speed.

27 Claims, 2 Drawing Sheets

SPEED PROTECTION SYSTEM FOR A MACHINE AND A METHOD THEREOF

FIELD OF THE INVENTION

This application claims the benefit of U.S. Provisional Patent Application No. 60/064,598 filed on Nov. 6, 1997, which is herein incorporated by reference. This invention relates generally to a speed protection system and, more particularly, to a system for monitoring the speed of a rotating shaft in a machine and providing overspeed and underspeed protection and a method thereof.

BACKGROUND OF THE INVENTION

For safety reasons, it is important to monitor the speed of a rotating shaft in machinery, such as the rotating shaft in a turbine. For example, if the shaft rotates to quickly during normal operations, then the machinery may become damaged. Additionally, if the shaft rotates too quickly, the machinery may begin to break apart posing a risk to operators and individuals near the machinery. Similarly, low speed conditions may also cause damage to the machinery and may also indicate that operational problems with the machinery exist and need to be addressed. Attempts to monitor for different speed conditions exist, but these systems have typically provided little protection and often have been costly.

For example, some of these prior systems have provided either overspeed or underspeed protection, but not both. Prior systems which have provided underspeed protection have failed to provide a time delay which permits the rotating shaft an opportunity to reach its operational speed without triggering a shutdown and an override if the minimum speed has been reached before the time period has expired. As a result, these systems have permitted machines to operate at unsafe rotational speeds for the shafts.

Another problem with some prior systems is with determining when to shut down the machinery if an overspeed condition exists. These systems rely upon a two-out-of-three voting arrangements to shut the machinery during for an overspeed condition. Although this arrangement is less likely to trigger false or unnecessary shutdowns, it is also more likely to permit the machinery to continue to operate when a shutdown is necessary. Additionally, if one of the set of three components fails, then the system will only shut down the machinery if the other two sets of components signal the need for a shutdown. If two sets of components fail, then these prior system will not work at all. As a result the machinery is more likely going to be permitted to run at unsafe speeds. Further, two out of three voting systems are expensive because they require three different sets of components to operate.

SUMMARY OF THE INVENTION

A system for monitoring the speed of a rotating shaft in a machine and providing overspeed and underspeed in accordance with one embodiment of the present invention includes a first speed detection system, a first tripping system, and a first time delay system. The first speed detection system determines a first rotational speed of the shaft in the machine. The first tripping system is coupled to the first speed detection system and to the machine. The first tripping system trips the machine to stop the rotation of the shaft when the first rotational speed is either less than a minimum speed or is more than a maximum speed. The first time delay system is coupled to the first tripping system. The first time delay system prevents the first tripping system from tripping the machine if the first rotational speed is less than the minimum speed until either a first period time has expired or the first rotational speed exceeds a first enabling speed.

A speed protection system in accordance with another embodiment of the present invention includes a first speed detection system, a second speed detection system, a first tripping system, a first time delay system, a second tripping system, and a second time delay system. The first speed detection system determines a first rotational speed of the shaft in the machine and the second speed detection system determines a second rotational speed of the shaft in the machine. The first tripping system is coupled to the first speed detection system, to the second speed detection system, and to the machine. The first tripping system trips the machine to stop the rotation of the shaft when the first rotational speed and the second rotational speed are both less than a minimum speed or the first rotational speed is more than a maximum speed. The first time delay system is coupled to the first tripping system. The first time delay system prevents the first tripping system from tripping the machine if the first rotational speed and the second rotational speed are less than the minimum speed until either a first period time has expired or the first rotational speed exceeds a first enabling speed. The second tripping system is coupled to the first speed detection system, to the second detection system, and to the machine. The second tripping, system trips the machine to stop the rotation of the shaft when the first rotational speed and the second rotational speed are both less than a minimum speed or the second rotational speed is more than a maximum speed. The second time delay system is coupled to the second tripping system. The second time delay system prevents the second tripping system from tripping the machine if the first rotational speed and the second rotational speed are less than the minimum speed until either a second period time has expired or the second rotational speed exceeds a second enabling speed.

A method for providing speed protection in accordance with another embodiment of the present invention includes determining a first rotational speed for the shaft, tripping the machine to stop the rotation of the shaft when the first rotational speed is less than a minimum speed or is more than a maximum speed, and preventing the machine from being tripped if the first rotational speed is less than the minimum speed until either a first period time has expired or the first rotational speed exceeds a first enabling speed.

A method for providing speed protection in accordance with yet another embodiment of the present invention includes determining a first rotational speed for the shaft, determining a second rotational speed for the shaft, tripping the machine to stop the rotation of the shaft when the first rotational speed and the second rotational speed are both less than a minimum speed or either the first rotational speed or the second rotational speed is more than a maximum speed, and preventing the machine from being tripped if the first rotational speed and the second rotational speed are both less than the minimum speed until either a first period time has expired, a second period of time has expired, the first rotational speed exceeds a first enabling speed, or the second rotational speed exceeds a second enabling speed.

The present invention provides a number of advantages including providing both underspeed and overspeed protection for a machine with a rotating shaft. As a result, both the machine and operators of the machine are protected from damage and or injury which might occur if the machine continued to operate at unsafe speeds.

Another advantage of the present invention is that a time delay is provided when the shaft begins to operate so that the underspeed protection does not prematurely trigger the machine to stop the rotation of the shaft until a period of time has expired. Additionally, the present invention provides an override of the time delay if the rotating shaft reaches an enabling speed at or above the minimum speed before the period of time has expired so that the underspeed protection can be engaged earlier. As a result, the present invention does not produce unnecessary shutdowns of the machine during startup, but still engages underspeed protection at the earliest possible time.

Yet another advantage of the present invention is that the initial period of time that the underspeed protection is disengaged is adjustable. As a result, the speed protection system can be customized to the particular application.

Yet another advantage of the present invention is that the speed protection system is designed to shut down the machine to stop rotation of the shaft if power to the speed protection system is lost. As a result, the shaft in the machine will not be permitted to rotate without the speed protection system in operation.

Yet another advantage of the present invention is that it provides a safer and more cost effective alternative to prior speed protection system. With the present invention, only one of the systems needs to sense, for example an overspeed condition, to cause the speed protection system to trip the turbine and stop the shaft from rotating. Even if only one of the two sensing systems in the present invention is operational, the speed protection system will continue to operate and will allow the machine to continue to operate if the rotational speed of the shaft stays between the minimum and maximum speeds. Since the present invention only needs two sets of components instead of the three sets used in two-of-three voting systems, the present invention is less expensive.

DETAILED DESCRIPTION

Figure 1:
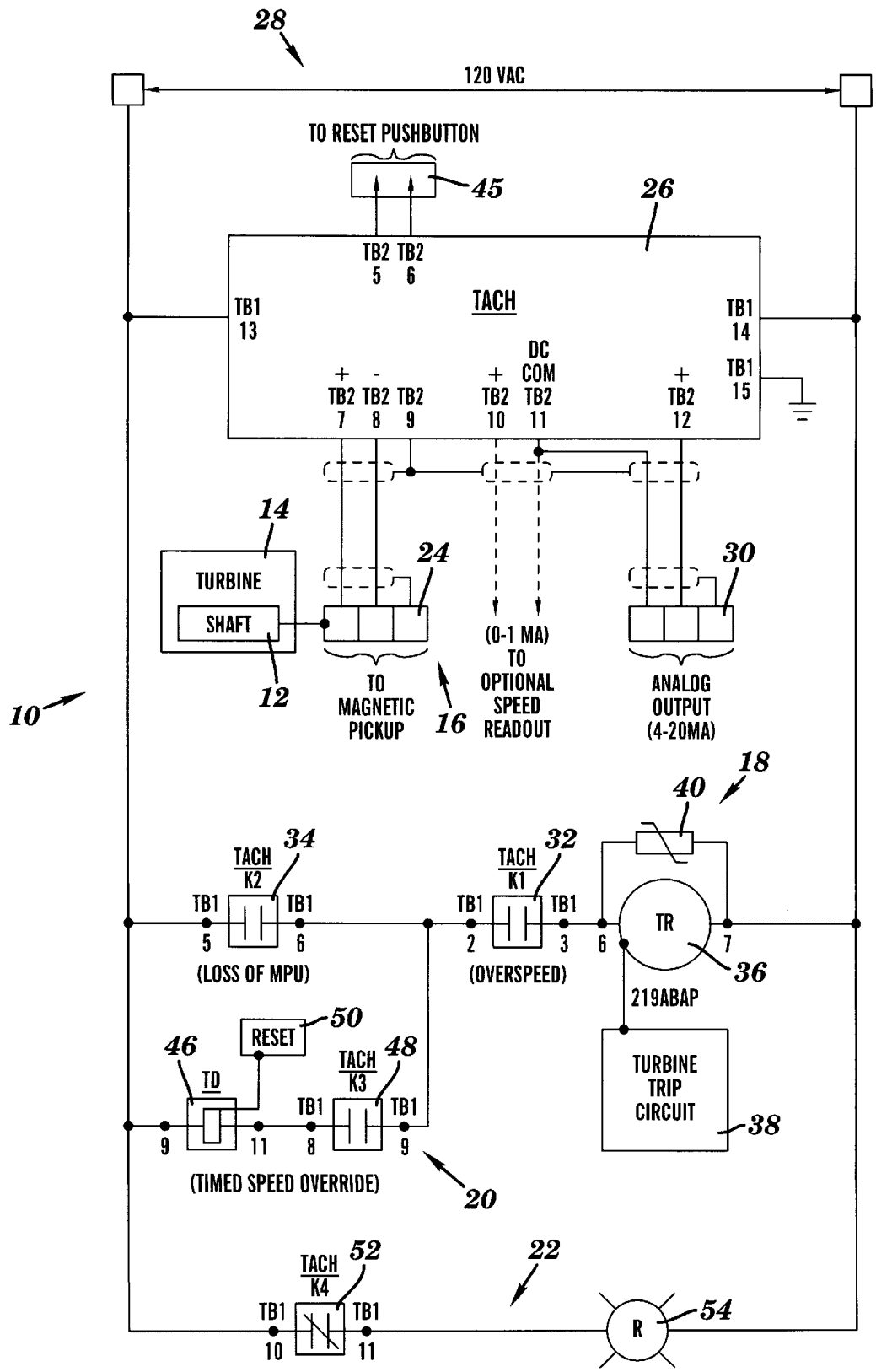
FIG. 1 is a diagram of a simplex version of a speed protection system in accordance with one embodiment of the present invention.

A system 10 for monitoring the speed of a rotating shaft 12 in a machine 14 and providing overspeed and underspeed protection in accordance with one embodiment of the present invention is illustrated in FIG. 1. The speed protection system 10 includes a speed detection system 16, a tripping system 18, and a time delay system 20. The speed protection system 10 provides a number of advantages including providing both underspeed and overspeed protection for the machine 14 as well as providing a time delay for the startup of the machine 14 to prevent the system 10 from prematurely tripping the machine 14 for an underspeed condition and providing an override feature if the rotating shaft 12 has reached an enabling speed before the startup time period has expired.

Referring to FIG. 1, one embodiment of the speed protection system 10 coupled to machinery 14 with rotating shaft 12 is illustrated. In this particular embodiment, the machinery 14 is a turbine with a rotating shaft 12, although the present invention could be used with other types of machinery as needed or desired.

A speed detection system 10 is used to measure the speed of the rotating shaft 12 which is then used to control the operation of the tripping system 18, the time delay system 20, and an optional overspeed signaling system 22. Since the various components which can be used to implement a speed detection system along with their operation are well known to those of ordinary skill in the art, they will not be discussed in detail here. In this particular embodiment, the speed detection system 16 includes a speed monitoring unit 24 and a tachometer 26. The speed monitoring unit 24 is positioned adjacent to the rotating shaft 12 and generates a signal which represents the rotational speed of the rotating shaft 12 and transmits the signal to the tachometer 26. By way of example, in this particular embodiment the speed monitoring unit 24 is a magnetic pick-up unit which monitors the frequency with which a gear on the rotating shaft 12 passes the unit and provides a signal representative of the rotational speed to the tachometer 26. Although one example of a speed detection system 16 is shown, other types of speed detection systems can be used as needed or desired.

The tachometer 26 receives the signal from the speed monitoring unit 24 and converts it to a speed signal. The tachometer 26 is coupled to a power source 28. In this particular embodiment, the power source 28 is a 120 volt AC power source, although other power sources can be used as needed or desired. The tachometer 26 may include an optional display 30 which illustrates the measured speed of the rotating shaft 12 to the operator. For ease of illustration only, some of the components which are located within the tachometer 26 are illustrated outside of the tachometer 26. These components include the designation "TACH" in FIG. 1 to indicate that they are located within the tachometer 26. By way of example only, a tachometer 26 such as the Tach Pack 3 produced by Air Pax can be used.

The speed protection system 10 includes tripping system 18 which is coupled to the tachometer 26 and to the power source 28. The tripping system 18 trips the turbine 14 to stop the rotation of the shaft 12 if the measured rotational speed of the shaft 12 is either less than a minimum speed or exceeds a maximum speed. Since the various components which can be used to implement a tripping system along with their operation are well known to those of ordinary skill in the art, they will not be discussed in detail here. In this particular embodiment, the tripping system 18 includes an overspeed monitoring device 32, an underspeed monitoring device 34, a tripping device 36, and a trip circuit 38. The tripping device 36 is coupled in series with the overspeed monitoring device 32 and the underspeed monitoring device 34 and is also coupled to the trip circuit 38. An optional surge protector 40 may be coupled in parallel with the tripping device 36. In this particular embodiment, overspeed monitoring device 32 and underspeed monitoring device 34 are relays, although other components can be used for these devices as needed or desired. Since the operation of relays is well known to those of ordinary skill in the art, it will not be discussed in detail here. As discussed earlier, overspeed monitoring device 32 and underspeed monitoring device 34 are located within the tachometer 26, although for ease of illustration are shown outside of the tachometer 26. Although one example of a tripping system 18 is shown, other types of tripping systems can be used as needed or desired.

In this particular embodiment, when the speed protection system 10 is on or energized, the underspeed monitoring device 34 and the overspeed monitoring device 37 are normally closed. When both the underspeed monitoring device 34 and the overspeed monitoring device 32 are closed, then the tripping device 36 also remains closed and does not signal trip circuit 38 to trip the machine 14.

When either the overspeed monitoring device 32 or the underspeed monitoring device 34 are de-energized due to either an overspeed condition or an underspeed condition, then the tripping device 36 is de-energized (unless a time delay device 46 and an enabling monitoring device 48 override the underspeed monitoring device 34 as explained in greater detail below). De-energizing the tripping device 36 signals the trip circuit 38 to shut off the fuel supply to the machine 14 to stop the rotation of the shaft 12. In this particular embodiment, the minimum speed below which an underspeed condition exists is 500 rpms, although this minimum speed can vary as needed or desired for the particular application. Additionally in this particular embodiment, the maximum speed is 3960 rpms above which an overspeed condition exists, although this maximum speed can vary as needed or desired for the particular application. Since the components for comparing a measured speed against one or more stored speeds to determine if the speed is greater, less than, or equal to the stored speeds, as well as components for energizing and de-energizing relays or engaging switches to open or close in response to these comparisons and components for tripping devices and tripping circuits for tripping the machine are well known to those of ordinary skill in the art, they will not be discussed in detail here. Although in this particular example, a tripping device 40 and a tripping circuit 38 are used to cut off the fuel supply to the machinery 14 to stop the rotation of the shaft, other components and methods for tripping the machinery 14 to stop the rotation of the shaft 12 can be used as needed or desired.

One of the advantages of the present invention is that if the speed protection system 10 loses power, then the underspeed monitoring device 34 and the overspeed monitoring device 32 open and the trip device 36 signals the trip circuit 38 to trip the machine 14. Accordingly, the machinery 14 will not operate without the speed protection system 10.

The time delay system 20 is coupled in parallel with the underspeed monitoring device 34. The time delay system 20 prevents the tripping system 18 from tripping the machine 14 to stop the rotation of the shaft 12 if the measured rotational speed is less than a minimum speed until either a first period of time expires or the measured rotational speed of the shaft 12 exceeds an enabling speed. Since the various types of components which can be used to implement a time delay system are well known to those of ordinary skill in the art, they will not be discussed in detail here. In this particular embodiment, the time delay system 20 includes a time delay device 46 coupled in series with an enabling monitoring device 48. The time delay device 46 remains closed until a first period of time determined by the time delay device 46 has expired. Typically, the time delay device 46 begins counting when the reset push button 45 is reset. By way of example only, the first period of time may be about one minute. In this particular embodiment, enabling monitoring device 48 is a relay, although other components can be used as needed or desired. The enabling monitoring device 48 is located within the tachometer 26. A reset device 50 is coupled to the time delay device 46. When the reset device 50 is engaged, the time delay device 46 resets the count. One of the advantages of the present invention is that the time delay device 46 is adjustable so that the first period of time during which the time delay device 46 remains closed is adjustable to the particular application. Although one example of a time delay system 20 is shown, other types of time delay systems can be used as needed or desired.

When the speed protection system 10 is on or energized the enabling monitoring device 48 is normally closed If the measured rotational speed of the shaft 12 goes above an enabling speed, then the enabling monitoring device 48 is opened and the underspeed monitoring device 34 is engaged to trip or stop the rotation of the shaft 12 in the machinery 14 if an underspeed condition occurs, even if the first period of time determined by the time delay device 46 has not timed out. The enabling speed is set to be at or above the minimum speed and below the maximum speed. By way of example, in this particular embodiment the enabling speed is 600 rpms, although this enabling speed can vary as needed or desired for the particular application. Accordingly, another advantage of the present invention is that the time delay system 20 permits the machine 14 to reach its operating speed during startup without triggering a shutdown and also engages the underspeed monitoring device 34 when the shaft 12 reaches an enabling speed before the first period of time has expired to provide underspeed protection as soon as it is possible.

The speed protection system 10 may also include the optional overspeed signaling system 22 which is coupled to the tachometer 26 and to the power source 28. In this particular embodiment, the overspeed signaling system 22 includes an overspeed alarming device 52 coupled in series with a signaling device 54. A variety of different types of signaling devices 54 can be used, such as a light or a warning buzzer. In this particular embodiment, the overspeed alarming device 52 is a latching relay which is located in the tachometer 26. The overspeed alarming device 52 is normally open. When the measured rotational speed of the shaft 12 exceeds the maximum speed, the overspeed alarming device 52 closes to connect the signaling device 54 to the power source 28. The signaling device 54 turns on to signal an overspeed condition. Although one example of an overspeed signaling system 22 is shown, other types of overspeed signaling systems can be used as needed or desired.

The operation of the embodiment of the speed protection system 10 illustrated in FIG. 1 is discussed below. When the machine 14 is turned on and the shaft 12 begins to rotate, the speed monitoring unit 24 monitors the rotation of the shaft 12 and transmits a signal to the tachometer 26 which represents the rotational speed of the shaft 12. The tachometer 26 converts the signal from the speed monitoring unit 24 to a rotational speed. The measured rotational speed may be illustrated on an optional display 30.

When the shaft 12 starts to rotate, the time delay device 46 is triggered to start counting down for a first period of time. During the first period of time the time delay device 46 remains closed. While the measured rotational speed remains less than the enabling speed, 600 rpms in this particular example, and less than the maximum speed, 3960 rpms in this particular example, the enabling monitoring device 48 and the overspeed monitoring device 32 remain closed. With the time delay device 46 closed, the enabling monitoring device 48 closed, and the overspeed monitoring device 32 closed, the tripping device 36 remains energized and thus closed and does not signal the trip circuit 38 to trip the machine 14 to stop the rotation of the shaft 12. Meanwhile, while the measured rotational speed remains less than the minimum speed, the underspeed monitoring device 34 will be open.

When the measured rotational speed exceeds the enabling speed before the first period of time has expired, e.g. the measured rotational speed is at 601 rpms and the enabling speed is 600 rpms, then the time delay device 46 will remain closed, but the enabling monitoring device 48 will open, thus enabling underspeed monitoring device 34 to provide underspeed protection. As long as the measured rotational speed of the shaft 12 remains between the minimum speed and the maximum speed, the underspeed monitoring device 34 and the overspeed monitoring device 32 will remain closed, thus keeping the tripping device 36 energized and closed. As a result, the tripping device 36 will not signal the trip circuit 38 to trip the machine 14 to stop the rotation of the shaft 12. If the measured rotational speed of the shaft 12 is either less than the minimum speed or is more that the maximum speed, then either the underspeed monitoring device 34 or the overspeed monitoring device 32 will open and the tripping device 36 will no longer be energized and will open. As a result, the tripping device 36 will signal the trip circuit 38 to trip the machine 14 to stop the rotation of the shaft 12.

When the first period of time has expired, for example when sixty seconds have passed after the start of the rotation of the shaft 12, then the time delay device 46 will open and the underspeed monitoring device 34 will be engaged to provide underspeed protection. The underspeed monitoring device 34 and overspeed monitoring device 32 will remain closed if the measured rotational speed of the shaft 12 remains between the minimum speed and the maximum speed. As long as the underspeed and overspeed monitoring devices 34 and 32 remain closed, then the tripping device 36 will not signal the trip circuit 38 to stop the rotation of the shaft 12. If the measured rotational speed of the shaft 12 is either less than a minimum speed or more than a maximum speed, then either the underspeed monitoring device 34 or the overspeed monitoring device 32 will open and the tripping device 36 will no longer be energized and will open. When the tripping device 36 is opened, then the trip circuit 38 will be signaled to trip the machine 14 to stop the rotation of the shaft 12. Once the first period of time has expired, the status of the enabling monitoring device 48 does not effect the operation of the speed protection system 10.

If an overspeed condition is detected, then the overspeed alarming device 52 will close to connect the signaling device 54 to the power source 28. The signaling device 54 will provide a signal to the operator that an overspeed condition has occurred.

Although the operation of this embodiment of the present invention is discussed with reference to the components shown in FIG. 1, the method steps described in this operation can be carried out by other embodiments. By way of example only, the present invention could be carried out with a general purpose digital computer suitably programmed to accomplish the methods steps described above. The programmed computer would have an input to receive a measured rotational speed signal from a speed detection system and an output for issuing a trip signal to a tripping system to trip the machine when the programmed computer deems it is appropriate based on the conditions discussed in the operation above.

Figure 2:
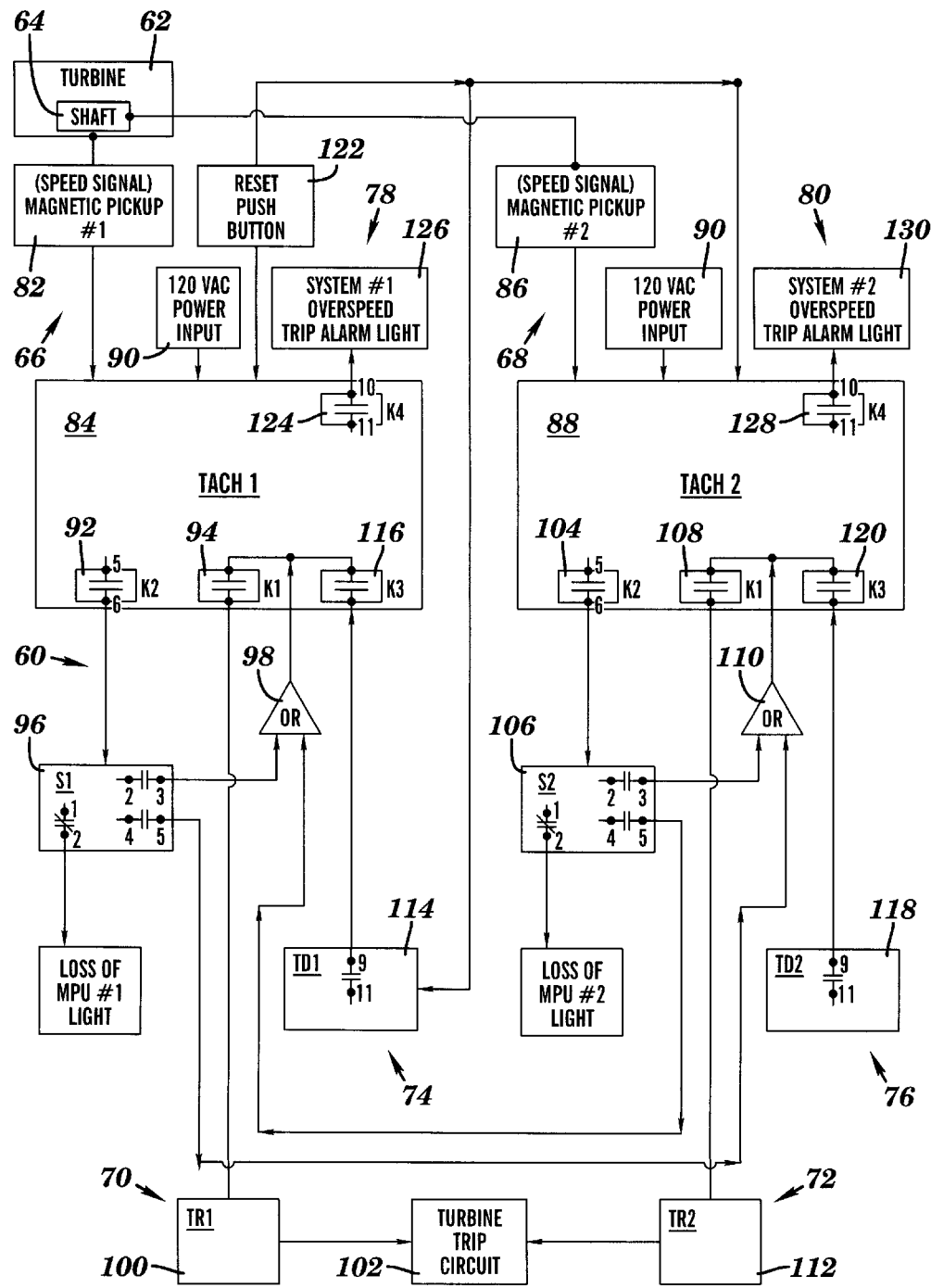
FIG. 2 is a diagram of a duplex version of a speed protection system in accordance with another embodiment of the present invention.

Referring to FIG. 2, another embodiment of a speed protection system 60 coupled to machinery 62 with a rotating shaft 64 is illustrated. Again in this particular embodiment, the machinery 62 is a turbine with a rotating shaft, although the present invention could be used with other types of machinery as needed or desired.

First and second speed detection systems 66 and 68 are used to take two different readings of the speed of the rotating shaft 64. These readings are used to control the operation of first and second tripping systems 70 and 72, first and second time delay systems 74 and 76, and optional first and second overspeed signaling systems 78 and 80. Since the various components which can be used to implement a speed detection system along with their operation are well known to those of ordinary skill in the art, they will not be discussed in detail here. In this particular embodiment, the first speed detection system 66 includes a first speed monitoring unit 82 and a first tachometer 84 and the second speed detection system 68 includes a second speed monitoring unit 86 and a second tachometer 88. The first and second speed monitoring units 82 and 86 are positioned adjacent to the rotating shaft 64 and each generate a signal which represents the rotational speed of the rotating shaft 64. The first speed monitoring unit 82 transmits the signal to the first tachometer 84 and the second speed monitoring unit 86 transmits the signal to the second tachometer 88. By way of example only, in this particular embodiment the first and second speed monitoring units 82 and 86 are each a magnetic pick-up unit which monitors the frequency with which a gear on the rotating shaft 64 passes the unit and provides a signal representative of the rotational speed to the tachometer 84 and 88.

The first tachometer 84 receives the signal from the first speed monitoring unit 82 and converts it to a first rotational speed signal and the second tachometer 88 receives the signal from the second speed monitoring unit 86 and converts it to a second rotational speed signal. The first and second tachometers 84 and 88 are each coupled to a power source 90. In this particular embodiment, the power source 90 is a 120 volt AC power source, although other power sources can be used as needed or desired. The first and second tachometers 84 and 88 may each include an optional display (not shown) which illustrates the measured speed of the rotating shaft 64 to the operator. Although one example of first and second speed detection systems are shown, other types of speed detection systems can be used as needed or desired.

One of the advantages of the present invention is that if either the first or the second speed detection systems 66 and 68 fail, the speed protection system 60 is still operational and will provide underspeed and overspeed protection for the machinery 62.

Another advantage of the present invention is that if the speed protection system 60 loses power, then the first underspeed nominating device 92, the first overspeed monitoring device 94, the second underspeed monitoring device 104, and the second overspeed monitoring device 108 will be de-energized and will open and the first and second tripping devices 100 and 102 will signal the trip circuit 102 to trip the machine 62. Accordingly, the machine 62 will not operate without the speed protection system.

The speed protection system 60 includes first tripping system 70 which is coupled to the first tachometer 84 and second tripping system 72 which is coupled to the second tachometer 88. The first tripping system 70 trips the machine 62 to stop the rotation of the shaft 64 if the first measured rotational speed and the second measured rotational speed of the shaft 64 are both less than a minimum speed or the first measured rotational speed exceeds a maximum speed. The second tripping system 72 trips the machine 62 to stop the rotation of the shaft 64 if the first measured rotational speed and the second measured rotational speed of the shaft 64 are both less than a minimum speed or the second rotational speed exceeds a maximum speed. Since the various components which can be used to implement a tripping system along with their operation are well known to those of ordinary skill in the art, they will not be discussed in detail here.

By way of example only, in this particular embodiment the first tripping system 70 includes a first underspeed monitoring device 92, a first overspeed monitoring device 94, a first switch 96, a first OR circuit 98, a first tripping device 100, and a trip circuit 102. The first tripping device 100 is to the first underspeed monitoring device 92, the first switch 96, the first OR circuit 98, and the first overspeed monitoring device 94 and is also coupled to the trip circuit 102. The first tripping device 100 is also coupled to the second underspeed monitoring device 104, a second switch 106, the first OR circuit 98, and the first overspeed monitoring device 94. In this particular embodiment, the first overspeed monitoring device 94, the first underspeed monitoring device 92, and the second underspeed monitoring device 104 are relays, although other components can be used as needed or desired. Since the operation of relays are well known to those of ordinary skill in the art, they will not be discussed here.

In this particular embodiment, the second tripping system 72 includes the second underspeed monitoring device 104, a second overspeed monitoring device 108, the second switch 106, a second OR circuit 110, a second tripping device 112, and the trip circuit 102. The second tripping device 112 is coupled to the second underspeed monitoring device 104, the second switch 106, the second OR circuit 110, and the second overspeed monitoring device 108 and is also coupled to the trip circuit 102. The second tripping device 112 is also coupled to the first underspeed monitoring device 92, the first switch 96, the second OR circuit 110, and the second overspeed monitoring device 108. In this particular embodiment, the second overspeed monitoring device 108, the first underspeed monitoring device 92, and the second underspeed monitoring device 104 are relays, although other components can be used as needed or desired. Again, since the operation of relays are well known to those of ordinary skill in the art, they will not be discussed in detail here. Although one example of first and second tripping systems are shown, other types of tripping systems 70 and 72 can be used as needed or desired.

In this particular embodiment, when the speed protection system 60 is on, the first underspeed monitoring device 92, the first overspeed monitoring device 94, the second underspeed monitoring device 104, and the second overspeed monitoring device 108 are energized and are normally closed. When either the first underspeed monitoring device 92 or the second underspeed monitoring device 104 are energized and closed and the first overspeed monitoring device 94 is also energized and closed, then the first tripping device 100 also remains energized and closed and thus does not signal the trip circuit 102 to trip the machine 62. Similarly, when either the first underspeed monitoring device 92 or the second underspeed monitoring device 104 are energized and closed and the second overspeed monitoring device 108 is also energized and closed, then the second tripping device 112 also remains energized and closed and does not signal the trip circuit 102 to trip the machine 62.

In this particular embodiment, the minimum speed below which an underspeed condition exists for the first underspeed monitoring device 92 and the second underspeed monitoring device 104 is 500 rpms, although this minimum speed can vary as needed or desired for the particular application. Additionally in this particular embodiment, the maximum speed above which an overspeed condition exists for the first overspeed monitoring device 94 and the second overspeed monitoring device 108 is 3960 rpms, although this maximum speed can vary as needed or desired for the particular application. Although in this particular example, tripping devices 100 and 112 and a tripping circuit 102 are used to cut off the fuel supply to the machinery 62 to stop the rotation of the shaft 64, other components and methods for tripping the machine 62 to stop the rotation of the shaft 64 can be used as needed or desired. Again since the components for comparing a measured speed against one or more stored speeds to determine if the speed is greater, less than, or equal to the stored speeds, as well as components for energizing and de-energizing relays or engaging switches to open or close in response to these comparisons are well known to those of ordinary skill in the art, they will not be discussed here.

The first time delay system 74 is coupled to the first overspeed monitoring device 94. The first time delay system 74 prevents the first tripping system 70 from tripping the machine 62 to stop the rotation of the shaft 64 if the first measured rotational speed and the second measured rotational speeds are both less than a minimum speed until either a first period of time expires or the first measured rotational speed of the shaft 64 exceeds an enabling speed. Since the various types of components which can be used to implement a time delay system are well known to those of ordinary skill in the art, they will not be discussed in detail here. In this particular embodiment, the first time delay system 74 includes first time delay device 114 coupled to first enabling monitoring device 116. The first time delay device 114 remains closed until a first period of time determined by the first time delay device 114 has expired. Typically, the first time delay device 114 begins counting when the shaft 64 of the machine 62 begins to rotate. By way of example only, the first period of time may be about one minute. In this particular embodiment, the first enabling monitoring device 116 is a relay, although other components can be used as needed or desired. A reset device 12 is coupled to the first time delay device 114. When the reset device 122 is enlarged, the first time delay device 114 resets the count. One of the advantages of the present invention is that the first time delay device 114 is adjustable so that the first period of time during which the first time delay device 114 remains closed is adjustable to the particular application.

The second time delay system 76 is coupled to the second overspeed monitoring device 108. The second time delay system 76 prevents the second tripping system 72 from tripping the machine 62 to stop the rotation of the shaft 64 if the first measured rotational speed and the second measured rotational speeds are both less than a minimum speed until either a first period of time expires or the second measured rotational speed of the shaft 64 exceeds an enabling speed. Again, since the various types of components which can be used to implement a time delay system are well known to those of ordinary skill in the art, they will not be discussed in detail here. In this particular embodiment, the second time delay system 76 includes second time delay device 118 coupled to second enabling monitoring device 120. The second time delay device 118 remains closed until a second period of time determined by the second time delay device 118 has expired. Typically, the second time delay device 118 begins counting when the shaft 64 of the machine 62 begins to rotate. By way of example only, the second period of time may be about one minute. In this particular embodiment, the second enabling monitoring device 120 is a relay, although other components can be used as needed or desired. The reset device 122 is coupled to the second time delay device 118. When the reset device 122 is engaged, the second time delay device 118 resets the count. Again, one of the advantages of the present invention is that the second time delay device 118 is adjustable so that the second period of time during which the second time delay device 118 remains closed is adjustable to the particular application. Although not necessary, the first period of time and the second period of time may be the same. Additionally, although one example of first and second time delay systems 74 and 76 are shown, other types of time delay systems can be used as needed or desired.

The enabling speed for the first and second enabling monitoring devices 16 and 120 is set to be at or above the minimum speed and below the maximum speed. By way of example, in this particular embodiment the enabling speed for the first and second enabling monitoring devices 116 and 120 is 600 rpms, although this enabling speed can vary as needed or desired for the particular application.

Accordingly, another advantage of the present invention is that the first and second time delay systems 74 and 76 permit the machine 62 to reach its operating speed during startup without triggering a shutdown and also engages the first and second underspeed monitoring devices 92 and 104 when the shaft 64 reaches an enabling speed before the first or second period of time have expired to provide underspeed protection as soon as possible.

The speed protection system 60 may also include the optional first overspeed signaling system 78 which is coupled to the first tachometer 84 and the optional second overspeed signaling system 80 which is coupled to the second tachometer 88. In this particular embodiment, the first overspeed signaling system 78 includes a first overspeed alarming device 124 coupled in series with a first signaling device 126 and the second overspeed signaling system 80 includes a second overspeed alarming device 128 coupled in series with a second signaling device 130. A variety of different types of signaling devices 128 and 130 can be used, such as a light or a warning buzzer. In this particular embodiment, the first overspeed alarming device 124 is a latching relay, the first signaling device 126 is a light, the second overspeed alarming device 128 is also a latching relay, and the second signaling device 130 is also a light. The first and second overspeed alarming devices 124 and 128 are normally open.

The operation of the embodiment of the speed protection system 60 illustrated in FIG. 2 is discussed below. When the machine 62 is turned on and the shaft 64 begins to rotate, the first speed monitoring unit 82 monitors the rotation of the shaft 64 and transmits a signal to the first tachometer 84 which represents the rotational speed of the shaft 64. The first tachometer 84 converts the signal from the first speed monitoring unit 82 to a first rotational speed. Similarly, when the machine 62 is turned on and the shaft 64 begins to rotate, the second speed monitoring unit 86 also monitors the rotation of the shaft 64 and transmits a signal to the second tachometer 88 which represents the rotational speed of the shaft 64. The second tachometer 88 converts the signal from the second speed monitoring unit 86 to a second rotational speed. The first and second measured rotational speeds will usually be the same speed. The first and second measured rotational speeds may be illustrated on optional displays (not shown) on the first and second tachometers 84 and 88, respectively.

When the shaft 64 starts to rotate, the first time delay device 114 is triggered to start counting down for a first period of time and the second time delay device 118 is triggered to start counting down for a second period of time. During the first period of time the first time delay device 114 remains closed and during the second period of time the second time delay device 118 remains closed. Typically, the first and second periods of time being counted down by the first and second time delay devices 114 and 118 will be the same.

As long as the first measured rotational speed remains less than the enabling speed, 600 rpms in this particular example, and less than the maximum speed, 3960 rpms in this particular example, the first enabling monitoring device 116 and the first overspeed monitoring device 94 remain closed. With the first time delay device 114 closed, the first enabling monitoring device 116 closed, and the first overspeed monitoring device 94 closed, the first tripping device 100 remains energized and thus closed and does not signal the trip circuit 102 to trip the machine 62 to stop the rotation of the shaft 64. Meanwhile, while the first measured rotational speed remains less than the minimum speed, the first underspeed monitoring device 92 will be open.

Similarly, as long as the second measured rotational speed remains less than the enabling speed, 600 rpms in this particular example, and less than the maximum speed, 3960 rpms in this particular example, the second enabling monitoring device 120 and the second overspeed monitoring device 108 remain closed. With the second time delay device 118 closed, the second enabling monitoring device 120 closed, and the second overspeed monitoring device 108 closed, the second tripping device 112 remains energized and thus closed and does not signal the trip circuit 102 to trip the machine 62 to stop the rotation of the shaft 64. Meanwhile, while the second measured rotational speed remains less than the minimum speed, the second underspeed monitoring device 104 will be open.

When the speed protection system 60 is on or energized, the first and second enabling monitoring devices 116 and 120 are energized and normally closed. When the first measured rotational speed exceeds the enabling speed before the first period of time has expired, e.g. the first measured rotational speed is at 601 rpms and the enabling speed is 600 rpms, then the first time delay device 114 will remain closed, but the first enabling monitoring device 116 will open thus enabling the first and second underspeed monitoring devices 92 and 104 to provide underspeed protection. As long as the first and second measured rotational speed of the shaft 64 remains above the minimum speed and the first measured rotational speed remains below the maximum speed, the first and second underspeed monitoring devices 92 and 104 and the first overspeed monitoring device 94 will remain closed, thus keeping the first tripping device 100 energized and closed. As a result, the first tripping device 100 will not signal the trip circuit 102 to trip the machine 62 to stop the rotation of the shaft 64.

If the first and second measured rotational speeds of the shaft 64 are both less than the minimum speed or if the first measured rotational speed is more that the maximum speed, then either the first and second underspeed monitoring devices 92 and 104 or the first overspeed monitoring device 94 will open and the first tripping device 100 will no longer be energized and will open. As a result, the first tripping device 100 will signal the trip circuit 102 to trip the machine 62 to stop the rotation of the shaft 64.

Similarly, when the second measured rotational speed exceeds the enabling speed before the second period of time has expired, e.g. the second measured rotational speed is at 601 rpms and the enabling speed is 600 rpms, then the second time delay device 118 will remain closed but the second enabling monitoring device 120 will open thus enabling the first and second underspeed monitoring devices 92 and 104 to provide underspeed protection. As long as the first and second measured rotational speed of the shaft 64 remains above the minimum speed and the second measured rotational speed remains below the maximum speed, the first and second underspeed monitoring devices 92 and 104 and the second overspeed monitoring device 108 will remain closed, thus keeping the second tripping device 112 energized and closed. As a result, the second tripping device 112 will not signal the trip circuit 102 to trip the machine 62 to stop the rotation of the shaft 64.

If the first and second measured rotational speeds of the shaft 64 are both less than the minimum speed or if the second measured rotational speed is more that the maximum speed, then either the first and second underspeed monitoring devices 92 and 104 or the second overspeed monitoring device 108 will open and the second tripping device 112 will no longer be energized and will open. As a result, the second tripping device 112 will signal the trip circuit 102 to trip the machine 62 to stop the rotation of the shaft 64.

When the first period of time has expired, for example when sixty seconds have passed after the start of the rotation of the shaft 64, then the first time delay device 114 will open and the first and second underspeed monitoring devices 92 and 104 will be engaged to provide underspeed protection. The first and second underspeed monitoring devices 92 and 104 and first overspeed monitoring device 94 will remain closed if the first and second measured rotational speeds of the shaft remain above the minimum speed and if the first measured rotational speed remains below the maximum speed. As long as the first and second underspeed monitoring devices 92 and 104 and the first overspeed monitoring device 108 remain closed, then the first tripping device 100 will not signal the trip circuit 102 to stop the rotation of the shaft 64. If the first and second measured rotational speeds of the shaft 64 are both less than a minimum speed or the first rotational speed is more than a maximum speed, then either the first and second underspeed monitoring devices 92 and 104 or the first overspeed monitoring device 94 will open and the first tripping device 100 will no longer be energized and will open. When the first tripping device 100 is opened, then the trip circuit 102 will be signaled to trip the machine 62 to stop the rotation of the shaft 64. Once the first period of time has expired, the status of the first enabling monitoring device 116 does not effect the operation of the speed protection system 60.

Similarly, when the second period of time has expired, for example when sixty seconds have passed after the start of the rotation of the shaft 64, then the second time delay device 118 will open and the first and second underspeed monitoring devices 92 and 104 will be engaged to provide underspeed protection. The first and second underspeed monitoring devices 92 and 104 and second overspeed monitoring device 108 will remain closed if the first and second measured rotational speeds of the shaft 64 remain above the minimum speed and if the second measured rotational speed remains below the maximum speed. As long as the first and second underspeed monitoring devices 92 and 104 and the second overspeed monitoring device 108 remain closed, then the second tripping device 112 will not signal the trip circuit 102 to stop the rotation of the shaft 64. If the first and second measured rotational speeds of the shaft 64 are both less than a minimum speed or the second rotational speed is more than a maximum speed, then either the first and second underspeed monitoring devices 92 and 104 or the second overspeed monitoring device 108 will open and the second tripping device 112 will no longer be energized and will open. When the second tripping device 112 is opened, then the trip circuit 102 will be signaled to trip the machine 62 to stop the rotation of the shaft 64. Once the second period of time has expired, the status of the second enabling monitoring device 120 does not effect the operation of the speed protection system 60.

As discussed earlier, one of the advantages of the present invention is that even if one of the speed detection systems 66 and 68 fails, the speed protection system 60 remains operational and will continue to provide overspeed and under speed protection. By way of example, if the first measured rotational speed is measured as 0 rpms (even though the shaft is rotating), the second measured rotational speed is 700 rpms, and the first and second periods have expired, then the first underspeed monitoring device 92 will be de-energized and open, but the second underspeed monitoring device 104 will still be energized and closed and the first overspeed monitoring device 94 will remain closed. As a result, the first tripping circuit 100 will remain energized and closed and will not signal the tripping circuit 102 to trip the machine 62 and stop the rotation of the shaft 64. Meanwhile, underspeed and overspeed protection will be provided by the second underspeed and overspeed monitoring devices 104 and 108. The first underspeed monitoring device 92 will be open, but the second underspeed and overspeed monitoring devices 104 and 108 will remain closed as long as the second measured rotational speed remains between the minimum and maximum speeds. If the second measured rotational speed either dips below the minimum speed or goes above the maximum speed, then either the second underspeed monitoring device 104 or the second overspeed monitoring device 108 will open and the second tripping device 112 will open to signal the trip circuit 102 to stop the rotation of the shaft 64.

If an overspeed condition is detected with the first measured rotational speed, then the first overspeed alarming device 124 will close to connect the first signaling device 126 to the power source. The first signaling device 126 will provide a signal to the operator that an overspeed condition has occurred. Similarly, if an overspeed condition is detected with the second measured rotational speed, then the second overspeed alarming device 128 will close to connect the second signaling device 130 to the power source. The second signaling device 130 will provide a signal to the operator that an overspeed condition has occurred.

Again, although the operation of this embodiment of the present invention is discussed with reference to the components shown in FIG. 2, the method steps described in this operation can be carried out by other embodiments. By way of example only, the present invention could be carried out with a general purpose digital computer suitably programmed to accomplish the methods steps described above. The programmed computer would have an input to receive measured rotational speed signals from speed detection systems and an output for issuing one or more trip signals to trip the machine when the programmed computer deems it appropriate based on the conditions discussed in the operation above.

Having thus described the basic concept of the invention, it will be rather apparent to those skilled in the art that the foregoing detailed disclosure is intended to be presented by way of example only, and is not limiting. Various alternations. improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A system for monitoring the speed of a rotating shaft in a machine and providing overspeed and underspeed protection comprising:

a first speed detection system for determining a first rotational speed of the shaft in the machine;

a first tripping system coupled to the first speed detection system and to the machine, the first tripping system tripping the machine to stop the rotation of the shaft when the first rotational speed is either less than a minimum speed or is more than a maximum speed; and a first time delay system coupled to the first tripping system, the first time delay system preventing the first tripping system from tripping the machine if the first rotational speed is less than the minimum speed until either a first period time has expired or the first rotational speed exceeds a first enabling speed.

2. The speed protection system as set forth in claim 1 wherein the first tripping system comprises:

a first tripping device coupled to the machine;

a first overspeed monitoring device coupled in series with the first tripping device, the first overspeed monitoring device signaling the first tripping device to trip the machine if the first rotational speed is more than the maximum speed; and a first underspeed monitoring device coupled in series with the first overspeed monitoring device and the first tripping device, the first underspeed monitoring device signaling the first tripping device to trip the machine if the first rotational speed is less than the minimum speed, wherein the first time delay system is coupled in parallel with the first underspeed monitoring device.

3. The speed protection system as set forth in claim 2 wherein the first time delay system comprises:

a first adjustable time delay device; and a first enabling speed monitoring device coupled in series with the first adjustable time delay device, the first adjustable time delay device and the first enabling speed monitoring device preventing the first underspeed monitoring device from tripping the machine if the first rotational speed is less than the minimum speed until either the first adjustable time delay device signals that the first period time has expired or the first enabling speed monitoring device signals that the first rotational speed has exceeded the first enabling speed.

4. The speed protection system as set forth in claim 1 further comprising a first overspeed signaling system which signals when the first rotational speed exceeds the maximum speed.

5. The speed protection system as set forth in claim 4 wherein the first overspeed signaling system comprises:

a first overspeed alarming device; and a first signaling device coupled in series with the first overspeed alarming device, the first overspeed alarming device signaling the first signaling device to signal when the first rotational speed exceeds the maximum speed.

6. The speed protection system as set forth in claim 1 further comprising:

a second speed detection system for determining a second rotational speed of the shaft in the machine, the second speed detection system coupled to the first tripping system;

wherein the first tripping system trips the machine to stop the rotation of the shaft when either the first rotational speed and the second rotational speed are less than a minimum speed or the first rotational speed is more than a maximum speed; and wherein the first time delay device prevents the first tripping system from tripping the machine if the first rotational speed and the second rotational speed are less than the minimum speed until either the first period time has expired or the first rotational speed exceeds the first enabling speed.

7. The speed protection system as set forth in claim 6 wherein the first tripping system comprises:

a first tripping device coupled to the machine;

a first overspeed monitoring device coupled in series with the first tripping device, the first overspeed monitoring device signaling the first tripping device to trip the machine if the first rotational speed is more than the maximum speed; and a first underspeed monitoring device coupled in series with the first overspeed monitoring device and the first tripping device;

a second underspeed monitoring device coupled in parallel with the first underspeed monitoring device, the first underspeed monitoring device and the second underspeed monitoring device signaling the first tripping device to trip the machine if the first rotational speed monitored by the first underspeed monitoring device and the second rotational speed monitored by the second underspeed monitoring device are both less than the minimum speed, wherein the first time delay system is coupled in parallel with the first underspeed monitoring device and the second underspeed monitoring device.

8. The speed protection system as set forth in claim 7 wherein the first time delay system comprises:

a first adjustable time delay device; and a first enabling speed monitoring device coupled in series with the first adjustable time delay device, the first adjustable time delay device and the first enabling speed monitoring device preventing the first underspeed monitoring device and the second underspeed monitoring device from tripping the machine if the first rotational speed and the second rotational speed are both less than the minimum speed until either the first adjustable time delay device signals that the first period time has expired or the first enabling speed monitoring device signals that the first rotational speed exceeds the first enabling speed.

9. The speed protection system as set forth in claim 8 further comprising:

a second tripping system coupled to the second speed detection system and to the machine, the second tripping system tripping the machine to stop the rotation of the shaft when the first rotational speed and the second rotational speed are both less than a minimum speed or the second rotational speed is more than a maximum speed; and a second time delay system coupled to the second tripping system, the second time delay system preventing the second tripping system from tripping the machine if the first rotational speed and the second rotational speed are less than the minimum speed until either a second period time has expired or the second rotational speed exceeds a second enabling speed.

10. The speed protection system as set forth in claim 9 wherein the second tripping system comprises:

a second tripping device coupled to the machine;

a second overspeed monitoring device coupled in series with the second tripping device, the second overspeed monitoring device signaling the second tripping device to trip the machine if the second rotational speed is more than the maximum speed; and a second underspeed monitoring device coupled in series with the second overspeed monitoring device and the second tripping device, the first underspeed monitoring device coupled in parallel with the second underspeed monitoring device, the first underspeed monitoring device and the second monitoring device signaling the second tripping device to trip the machine if the first rotational speed monitored by the first underspeed monitoring device and the second rotational speed monitored by the second underspeed monitoring device are both less than the minimum speed, wherein the second time delay system is coupled in parallel with the first underspeed monitoring device and the second underspeed monitoring device.

11. The speed protection system as set forth in claim 10 wherein the second time delay system comprises:

a second adjustable time delay device; and a second enabling speed monitoring device coupled in series with the second adjustable time delay device, the second adjustable time delay device and the second enabling speed monitoring device preventing the first underspeed monitoring device and the second underspeed monitoring device from tripping the machine if the first rotational speed and the second rotational speed are both less than the minimum speed until either the second adjustable time delay device signals that the second period time has expired or the second enabling speed monitoring device signals that the second rotational speed exceeds the second enabling speed.

12. The speed protection system as set forth in claim 11 further comprising a second overspeed signaling system which signals when the second rotational speed exceeds the maximum speed.

13. The speed protection system as set forth in claim 12 wherein the second overspeed signaling system comprises:

a second overspeed alarming device; and a second signaling device coupled in series with the second overspeed alarming device the second overspeed alarming device signaling the second signaling device to signal when the second rotational speed exceeds the maximum speed.

14. A system for monitoring the speed of a rotating shaft in a machine and providing overspeed and underspeed protection comprising:

a first speed detection system for determining a first rotational speed of the shaft in the machine;

a second speed detection system for determining a second rotational speed of the shaft in the machine;

a first tripping system coupled to the first speed detection system to the second speed detection system, and to the machine, the first tripping system tripping the machine to stop the rotation of the shaft when the first rotational speed and the second rotational speed are both less than a minimum speed or the first rotational speed is more than a maximum speed;

a first time delay system coupled to the first tripping system, the first time delay system preventing the first tripping system from tripping the machine if the first rotational speed and the second rotational speed are less than the minimum speed until either a first period time has expired or the first rotational speed exceeds a first enabling speed;

a second tripping system coupled to the first speed detection system, to the second detection system, and to the machine, the second tripping system tripping the machine to stop the rotation of the shaft when the first rotational speed and the second rotational speed are both less than a minimum speed or the second rotational speed is more than a maximum speed; and a second time delay system coupled to the second tripping system, the second time delay system preventing the second tripping system from tripping the machine if the first rotational speed and the second rotational speed are less than the minimum speed until either a second period time has expired or the second rotational speed exceeds a second enabling speed.

15. The speed protection system as set forth in claim 14 wherein the first tripping system comprises:

a first tripping device coupled to the machine;

a first overspeed monitoring device coupled in series with the first tripping device, the first overspeed monitoring device signaling the first tripping device to trip the machine if the first rotational speed is more than the maximum speed; and a first underspeed monitoring device coupled in series with the first overspeed monitoring device and the first tripping device;

a second underspeed monitoring device coupled in parallel with the first underspeed monitoring device, the first underspeed monitoring device and the second underspeed monitoring device signaling the first tripping device to trip the machine if the first rotational speed monitored by the first underspeed monitoring device and the second rotational speed monitored by the second underspeed monitoring device are both less than the minimum speed, wherein the first time delay system is coupled in parallel with the first underspeed monitoring device and the second underspeed monitoring device.

16. The speed protection system as set forth in claim 15 wherein the first time delay system comprises:

a first adjustable time delay device; and a first enabling speed monitoring device coupled in series with the first adjustable time delay device, the first adjustable time delay device and the first enabling speed monitoring device preventing the first underspeed monitoring device and the second underspeed monitoring device from tripping the machine if the first rotational speed and the second rotational speed are both less than the minimum speed until either the first adjustable time delay device signals that the first period time has expired or the first enabling speed monitoring device signals that the first rotational speed exceeds the first enabling speed.

17. The speed protection system as set forth in claim 16 wherein the second tripping system comprises:

a second tripping device coupled to the machine;

a second overspeed monitoring device coupled in series with the second tripping device, the second overspeed monitoring device signaling the second tripping device to trip the machine if the second rotational speed is more than the maximum speed; and a second underspeed monitoring device coupled in series with the second overspeed monitoring device and the second tripping device, the first underspeed monitoring device coupled in parallel with the second underspeed monitoring device, the first underspeed monitoring device and the second monitoring device signaling the second tripping device to trip the machine if the first rotational speed monitored by the first underspeed monitoring device and the second rotational speed monitored by the second underspeed monitoring device are both less than the minimum speed, wherein the second time delay system is coupled in parallel with the first underspeed monitoring device and the second underspeed monitoring device.

18. The speed protection system as set forth in claim 17 wherein the second time delay system comprises:
a second adjustable time delay device, and
a second enabling speed monitoring device coupled in series with the second adjustable time delay device, the second adjustable time delay device and the second enabling speed monitoring device preventing the first underspeed monitoring device and the second underspeed monitoring device from tripping the machine if the first rotational speed and the second rotational speed are both less than the minimum speed until either the second adjustable time delay device signals that the second period time has expired or the second enabling speed monitoring device signals that the second rotational speed exceeds the second enabling speed.

19. The speed protection system as set forth in claim 14 further comprising:
a first overspeed signaling system which signals when the first rotational speed exceeds the maximum speed; and
a second overspeed signaling system which signals when the second rotational speed exceeds the maximum speed.

20. The speed protection system as set forth in claim 19 wherein the first overspeed signaling system comprises:
a first overspeed alarming device; and
a first signaling device coupled in series with the first overspeed alarming device, the first overspeed alarming device signaling the first signaling device to signal when the first rotational speed exceeds the maximum speed.

21. The speed protection system as set forth in claim 19 wherein the second overspeed signaling system comprises:
a second overspeed alarming device; and
a second signaling device coupled in series with the second overspeed alarming device the second overspeed alarming device signaling the second signaling device to signal when the second rotational speed exceeds the maximum speed.

22. A method for monitoring the speed of a rotating shaft in a machine and providing overspeed and underspeed protection comprising:
determining a first rotational speed for the shaft;
tripping the machine to stop the rotation of the shaft when the first rotational speed is less than a minimum speed or is more than a maximum speed; and
preventing the machine from being tripped if the first rotational speed is less than the minimum speed until either a first period time has expired or the first rotational speed exceeds a first enabling speed.

23. The method as set forth in claim 22 further comprising:
determining a second rotational speed for the shaft;
wherein the machine is tripped to stop the rotation of the shaft when the first rotational speed and the second rotational speed are less than a minimum speed or the first rotational speed is more than a maximum speed; and
wherein the machine is prevented from being tripped if the first rotational speed and the second rotational speed are both less than the minimum speed until either the first period time has expired or the first rotational speed exceeds a first enabling speed.

24. The method as set forth in claim 23 further comprising:
tripping the machine to stop the rotation of the shaft when the first rotational speed and the second rotational speed are less than a minimum speed or the first rotational speed is more than a maximum speed; and
preventing the machine from being tripped if the first rotational speed and the second rotational enabling speed are both less than the minimum speed until either a second period time has expired or the second rotational speed exceeds a second enabling speed.

25. The method as set forth in claim 22 further comprising signaling when either the first rotational speed or the second rotational speed exceeds the maximum speed.

26. A method for monitoring the speed of a rotating shaft in a machine and providing overspeed and underspeed protection comprising:
determining a first rotational speed for the shaft;
determining a second rotational speed for the shaft;
tripping the machine to stop the rotation of the shaft when the first rotational speed and the second rotational speed are both less than a minimum speed or either the first rotational speed or the second rotational speed is more than a maximum speed, and
preventing the machine from being tripped if the first rotational speed and the second rotational speed are both less than the minimum speed until either a first period time has expired a second period of time has expired the first rotational speed exceeds a first enabling speed, or the second rotational speed exceeds a second enabling speed.

27. The method as set forth in claim 26 further comprising signaling when either the first rotational speed or the second rotational speed exceeds the maximum speed.

* * * * *